Figure 1:
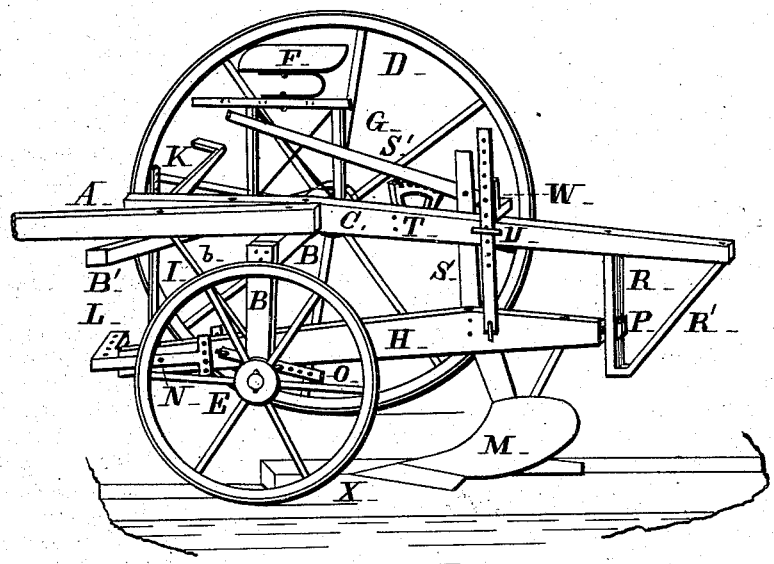

C. B. STEVENS.
Wheel-Plows.

No. 154,994. Patented Sept. 15, 1874.

Witness:—
Azem Holland,
Jno. H. Scully.

Inventor:—
Charles Brewster Stevens.
By Saml. J. Wallace,
Attorney.

UNITED STATES PATENT OFFICE.

CHARLES B. STEVENS, OF DONNELLSON, IOWA.

IMPROVEMENT IN WHEEL-PLOWS.

Specification forming part of Letters Patent No. 154,994, dated September 15, 1874; application filed January 6, 1874.

*To all whom it may concern:*

Be it known that I, CHARLES BREWSTER STEVENS, of Donnellson, Lee county, Iowa, have invented an Improvement in Riding-Plows, of which the following is a specification:

This invention relates to breaking-plows of the class which are mounted on wheels, with tongue and driver's seat. It is made substantially as set forth hereinafter, referring to the accompanying drawings, in which—

Figure 1 is a side view of the plow.

The tongue A is attached to the wheel-frame B B', and is made adjustable sidewise on the frame, for two or three horses abreast, &c. The parts B, B', and C form a triangular frame, the part C being fixed to parts B B', and reaching back over the line of the plow-beam as its support, and part B' acting as a brace between parts B C. The frame B is mounted on wheels D E. The large wheel D runs on the unbroken ground. The small wheel E runs in the furrow, and is attached by a depending portion of part B, having a brace, *b*, to part C, forward. The driver's seat F is mounted on a frame, G, attached to parts B B' near the wheel D, so as to bear most of the weight on it. Part G has holes in a line on top, so the seat may be changed forward and back, so the weight of the driver will nearly balance the weight of the plow behind. The front end of the plow-beam H is connected by a link part, I, to the end of lever K, so as to be raised or lowered by it. This link part has several holes in its upper end for attachment to lever K, to let the plow-beam down to different distances to plow to various depths. The end of lever K is pressed down by the driver's foot, to throw the point of the plow out of the ground. The team is attached by double or triple tree to clevis L. The front of the clevis has an arm extending to one side, with a line of holes along it and across the end of the beam, so that the team may be connected to suit two or three horses, and to adjust the running of the plow M. The clevis L is pivoted to the beam H at N, and has a line of holes up and down at its back end for a tempering-pin to regulate the depth of the plow. The plow-beam is held in place sidewise by a link-brace, O, from the descending portion of part B. This brace O has several holes in one end for attachment to part B, to adjust the distance of the beam. The back end of the plow-beam H has a pivot, P, held by and moving up and down in a slot in part R, from part C. The plow and beam are pivoted to turn on the axis between pivot P and the ends of links I O, on which it may be rocked to make it run to suit different conditions, as inclined to either side or level. This is regulated by lever S from the plow-beam, which the driver may move to either side. The upper portion of lever S is jointed, so the top portion may be turned forward to engage with a rack, T, with several notches to hold it at any angle desired. The depth of the plow is varied by a link part, U, from the plow-beam up through a bearing on part C. This has an elbow part, W, pivoted to it to rest on top of part C and hold up the plow. There are several holes for the attachment of part W, to vary the depth. In laying off a new furrow, where wheel E must run on the unbroken ground, the elbow of part W is turned up instead of down, allowing the plow to go deeper without changing the hole of attachment. The driver sits on the seat so as to nearly balance the weight of the plow behind, and throws up the point of the plow by his foot on lever K, and he changes the inclination sidewise by lever S S'.

I claim—

1. The combination of levers K S', frame C, with rack T, slotted pivot-holder R, plow M, holder O, and pivoted depth-regulator U W, substantially as set forth.

2. The combination of the plow M, frame C, with its rack-pivot T, and lever S', arranged to rock the plow sidewise and hold it at any inclination, and to lift it when required, substantially as set forth.

CHARLES BREWSTER STEVENS.

Witnesses:
SAML. J. WALLACE,
R. M. MARSHALL.